(12) United States Patent
Put et al.

(10) Patent No.: US 9,705,128 B2
(45) Date of Patent: Jul. 11, 2017

(54) NEGATIVE ELECTRODE MATERIAL FOR A RECHARGEABLE BATTERY AND METHOD FOR PRODUCING THE SAME

(71) Applicant: Umicore, Brussels (BE)

(72) Inventors: Stijn Put, Olmen (BE); Kris Driesen, Hasselt (BE); Jean-Sebastien Bridel, Geel (BE); Hailei Zhao, Hebei (CN); Jing Wang, Hebei (CN)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 14/652,947

(22) PCT Filed: Dec. 17, 2013

(86) PCT No.: PCT/EP2013/076835
§ 371 (c)(1),
(2) Date: Jun. 17, 2015

(87) PCT Pub. No.: WO2014/095811
PCT Pub. Date: Jun. 26, 2014

(65) Prior Publication Data
US 2015/0325839 A1   Nov. 12, 2015

(30) Foreign Application Priority Data
Dec. 20, 2012 (EP) .................................... 12198572

(51) Int. Cl.

| | |
|---|---|
| *H01M 2/16* | (2006.01) |
| *H01M 4/134* | (2010.01) |
| *H01M 4/133* | (2010.01) |
| *H01M 4/587* | (2010.01) |
| *H01M 4/36* | (2006.01) |
| *H01M 4/38* | (2006.01) |
| *H01M 4/485* | (2010.01) |
| *H01M 10/052* | (2010.01) |
| *H01M 4/62* | (2006.01) |

(52) U.S. Cl.
CPC ........... *H01M 4/134* (2013.01); *H01M 4/133* (2013.01); *H01M 4/364* (2013.01); *H01M 4/366* (2013.01); *H01M 4/386* (2013.01); *H01M 4/485* (2013.01); *H01M 4/587* (2013.01); *H01M 4/62* (2013.01); *H01M 4/625* (2013.01); *H01M 10/052* (2013.01)

(58) Field of Classification Search
CPC .... H01M 10/052; H01M 4/133; H01M 4/134; H01M 4/364; H01M 4/366; H01M 4/386; H01M 4/485; H01M 4/587; H01M 4/62; H01M 4/625; Y02E 60/122
See application file for complete search history.

(56) References Cited

U.S. PATENT DOCUMENTS

| | | |
|---|---|---|
| 5,204,024 A | 4/1993 | Onaka et al. |
| 2005/0233213 A1 | 10/2005 | Lee et al. |
| 2006/0068287 A1* | 3/2006 | Morita .................. H01M 4/134 429/223 |
| 2007/0254102 A1 | 11/2007 | Fukuoka et al. |
| 2010/0009261 A1 | 1/2010 | Watanabe |
| 2012/0115033 A1 | 5/2012 | Kim et al. |
| 2012/0295155 A1* | 11/2012 | Deng ..................... H01B 1/122 429/200 |
| 2014/0030597 A1* | 1/2014 | Jung ...................... C23C 18/54 429/231.1 |

FOREIGN PATENT DOCUMENTS

| | | |
|---|---|---|
| JP | 2002 151082 A | 5/2002 |
| WO | WO 02/083555 A3 | 10/2002 |
| WO | WO 2012/000858 A1 | 1/2012 |

OTHER PUBLICATIONS

Cui, L.-F., et al., "Inorganic Glue Enabling High Performance of Silicon Particles as Lithium Ion Battery Anode", *Journal of the Electrochemical Society*, vol. 158, No. 5 (2011), pp. A592-A596.
Cui, L.-F., et al., "Crystalline-Amorphous Core—Shell Silicon Nanowires for High Capacity and High Current Battery Electrodes", *Nano Letters*, vol. 9, No. 1 (2009), pp. 491-495.
Brunauer, S., et al., "Adsorption of Gases in Multimolecular Layers", *J. Am. Chem. Soc.*, vol. 60 (1938), pp. 309-319.
Guo, B., et al., "Electrochemical Reduction of Nano-$SiO_2$ in Hard Carbon as Anode Material for Lithium Ion Batteries", *Electrochemistry Communications*, vol. 10 (2008), pp. 1876-1878.
Schnurre, S.M., et al., "Thermodynamics and Phase Stability in the Si—O System", *Journal of Non-Crystalline Solids*, vol. 336 (2004), pp. 1-25.
International Search Report for PCT/EP2013/076835, mailed Mar. 11, 2014.

\* cited by examiner

*Primary Examiner* — Patrick Ryan
*Assistant Examiner* — Ben Lewis
(74) *Attorney, Agent, or Firm* — Brinks Gilson & Lione

(57) ABSTRACT

The invention relates to An active material for a rechargeable lithium ion battery, comprising metal (M) based particles and a silicon oxide $SiO_x$ with $0<x<2$, wherein said $SiO_x$ is an intimate mixture of amorphous silicon (Si) and crystalline silicon dioxide ($SiO_2$); wherein the metal (M) is preferably selected from the group consisting of Si, Sn, In, Al, Fe and combinations thereof.

13 Claims, 11 Drawing Sheets

NEGATIVE ELECTRODE MATERIAL FOR A RECHARGEABLE BATTERY AND METHOD FOR PRODUCING THE SAME

This application is a National Stage application of International Application No. PCT/EP2013/076835, filed Dec. 17, 2013, which claims the benefit of European Application No. 12198572.5, filed Dec. 20, 2012.

The present invention relates to an active material for use in a negative electrode of a lithium-ion (Li-ion) rechargeable battery, said active material comprising metal (M) based particles.

BACKGROUND

With the development of mobile electronic equipment, transportation, renewable-energy sectors, there is a strong demand for improved rechargeable battery systems, also known as secondary battery systems, with e.g. increased higher energy density. Compared to other secondary battery systems, systems based on lithium-ion batteries (LiBs) have many advantages in terms of high energy and power densities, long cycle life, low self-discharge, high operating voltage, wide temperature window, and no "memory effect". Due to its long cycle life, abundant material supply and relatively low cost, graphite is the state-of-the-art active material used in the negative electrode, i.e. anode, of such LIBs. However, the graphite-based anodes show a low energy density (only 372 mAh/g) but also safety issues caused by lithium deposition under overcharge conditions. Therefore, much attention is paid to develop alternative active materials for such anodes that have enhanced safety, high specific capacity and also long cycle life.

Silicon (Si) is a (semi)metal of special interest because of its potentially largest theoretical capacity (around 3600 mAh/g for a $Li_{15}Si_4$ alloy). However, the implementation of Si-based anodes has been hindered by rapid capacity fading upon charge/discharge cycling. Without being bound by any theory, the capacity loss was believed to be mainly due to an increased expansion/contraction of the active material, i.e. crystalline Si, during the insertion/extraction of Li-ions ($Li^+$), which leads to a strong mechanical stress of the Si crystallites and may result in the loss of electrical contact. Upon cycling, a rapid loss of reversible capacity was observed leading to poor battery performance.

Many strategies have been proposed to improve the cyclability of Si-based anode materials, such as (i) employing nano-technology to reduce the size of the Si-based particles, (ii) alloying Si with other elements and (iii) coating/mixing Si with carbon-based materials. One of the most appealing strategies proved to be the use of nano or sub-micron sized silicon based particles (such particles are also referred to as grains), to avoid cracking thereof during expansion and contraction upon cycling. However, the smaller the size of the particles, the higher their surface area; and a drawback thereof is that when such particles are contacted with an electrolyte which chemically interacts with the particles, the decomposition of said electrolyte is increased due to the larger available surface for unwanted reactions to occur.

An alternative material to pure Si is silicon oxide such as SiO. The so-called "Silicon monoxide" SiO, if it exists, would be the only compound of silicon in which silicon is bivalent. In recent years, experimental evidence taken via various methods has confirmed that silicon(II) oxide does not exist as a distinct phase but as a nano-scale mixture of crystalline Si and amorphous $SiO_2$. It was also shown that such mixing occurs over a scale of 3 to 4 nm. Therefore, as proved by Schnurre et al. in *Thermodynamics and phase stability in the Si—O system*, J. Non-Cryst. Solids 2004, 336, 1-24, "amorphous $SiO_x$ is not a classical homogeneous single phase, yet because of this small domain size it is also not a classical heterogeneous two-phase mixture". Therefore, amorphous $SiO_x$ with various amounts (x) of oxygen therein is characterized by many with the help of a random-mixture (RM) model, stating that over certain domains, silicon is bonded to only silicon or only oxygen and hence corresponding to an intimate, two-phase mixture of Si and $SiO_2$. This is confirmed by $^{29}Si$ MAS-NMR spectra of $SiO_x$ showing two different resonances whose chemical shift values are close to those of elemental state Si and $SiO_2$, suggesting that the RM model is the most appropriate description for $SiO_x$ microstructure.

$SiO_x$ is potentially a parent material for Si-based anode materials owing to the irreversible generation of $Li_2O$/$Li_4SiO_4$ and Si during the first lithiation (discharge) process. The Si particles formed in-situ during the first lithiation process are nano-sized and dispersed uniformly in a matrix containing a $Li_2O$ phase and a $Li_4SiO_4$ phase which are essentially simultaneously formed during said lithiation. Such matrix is an electrochemically inactive material which may have the ability to prevent the electrochemically active Si cluster from aggregating, and may thus improve the cycling stability of Si-based materials.

The commercially available $SiO_x$ is usually used as a powder that may be prepared by (1) using a method disclosed by US 2010/009261 A1 involving heating a mixture containing silicon and silicon dioxide in an inert gas atmosphere or in vacuum at a high temperature to generate SiO gas, and feeding oxygen gas to the SiO gas to form a gas mixture with various amounts x (usually x≥1) of oxygen, and depositing the gas mixture on a surface of a cooled substrate; (2) using a method according to US 2007/0254102 A1 involving mixing and depositing a gas mixture of SiO and Si gases on a substrate, the starting material to generate SiO gas being a mixture of a silicon oxide powder or a silicon dioxide powder with a metal silicon powder, where the x value is usually less than 1. However, such preparation methods of $SiO_x$ by simultaneously generating silicon and silicon oxide vapors and combining thereof with themselves and or with oxygen streams, necessitate a high working temperature (more than 2000° C.) due to the low vapor pressure of silicon and silicon oxide, which in turn may result in high cost and low yields.

As mentioned hereinabove, coating/mixing Si with carbon-based materials is also a strategy to obtain active materials that may provide LiBs using thereof with increased performance. Preparation methods of composites comprising $SiO_x$/graphite, $SiO_x$/carbon, and $SiO_x$/graphite/carbon, may involve ball milling commercial $SiO_x$ powder with graphite to form $SiO_x$/graphite composites. Other preparation methods of such composites may involve the formation of disordered carbon on the surface of $SiO_x$ particles by CVD, sol-gel, hydrothermal methods, etc., followed by a heat treatment. Such composite materials and their method of preparation are disclosed for example in US 2012/0115033; US 2005/0233213 and US 2006/0068287.

However, despite of all the latest advancements in the art of active materials suitable for utilization in the negative electrodes of LiBs, there is still a need for yet better materials that have the ability to further increase the performance of the batteries. In particular, for most applications batteries having increased capacity and reduced irreversibility are desirable. In an attempt to reach advantageous performances, the present inventors observed that the nature of the materials used in the manufacturing of the electrodes is of crucial importance. In particular they noticed that the nature of the $SiO_x$ is one of the most important parameters.

SUMMARY OF THE INVENTION

In an effort to at least achieve suitable battery capacities and optimal irreversibility, as well as to curtail the deleterious effects and the still remaining problems of the known active materials, the present invention provides an active material for a rechargeable lithium-ion battery, comprising metal (M) based particles and a silicon oxide $SiO_x$ with $0<x<2$, wherein said $SiO_x$ is an intimate mixture of amorphous silicon (Si) and crystalline silicon dioxide ($SiO_2$). Preferably, said active material is a negative active material, i.e. the material used as active material in the negative electrodes of LiBs.

The present inventors observed for the first time that a LiB using metal particles in combination with a silicon oxide ($SiO_x$) containing crystalline $SiO_2$ as active material, performs better than LiBs using Si oxides containing amorphous $SiO_2$. Without being bound to any theory, the inventors related the obtained advantages to a contribution of beneficial synergistic effects between the metal particles and the $SiO_2$'s crystallinity. Such benefits seem not present when using a $SiO_x$ containing amorphous $SiO_2$ as utilized by the above mentioned US 2012/0115033; US 2005/0233213 and US 2006/0068287.

According to the invention, the active material contains metal (M) based particles, i.e. particles comprising said metal, preferably, particles consisting of said metal. The metal (M) based particles may include any general metal, e.g. such as alkali or transition metals, but also any semi-metals, e.g. Si. Preferably the metal M is selected from Si, Sn, Sb, Ni, Ti, In, Al, Fe and combinations thereof. Most preferably the metal is Si, e.g. crystalline Si.

The metal (M) particles can have any shape and preferably have an average diameter of at least 10 nm in order to minimize a lithium consumption during the first charge/discharge cycles; more preferably at least 15 nm; most preferably at least 20 nm. Preferably, said average diameter is at most 200 nm in order to minimize cracking of particles typically due to internal stresses arising during charge/discharge cycles; more preferably at most 150 nm; most preferably at most 100 nm.

According to the invention, the $SiO_x$ comprises an intimate mixture of (Si) and silicon dioxide ($SiO_2$). Intimate mixtures are also referred to or known in the art as nanometric mixtures, i.e. mixtures where the mixing of Si and $SiO_2$ occurs over a nanometric scale, e.g. over the scale of from 1 to 5 nm, more preferably from 3 to 4 nm. In other words, it is preferred that the $SiO_x$ used in accordance with the invention contains domains consisting of metallic Si having dimensions of between 1 nm and 5 nm, more preferably between 3 nm and 5 nm.

In accordance with the invention, the Si contained by said $SiO_x$ is amorphous and the $SiO_2$ contained by said $SiO_x$ is crystalline. Preferably, the amounts of amorphous Si and crystalline $SiO_2$ present in said $SiO_x$ are chosen such that $0.3 \leq x \leq 1.5$, more preferably $0.5 \leq x < 1.5$.

The silicon oxide $SiO_x$ used in accordance with the invention may have any form factor. Preferably, said silicon oxide is in the form of particles which may be admixed with the metal particles; more preferably said silicon oxide is in the form of a layer covering at least partially the metal particles; most preferably, said silicon oxide is in the form of a matrix embedding said metal particles.

Hereinafter, the figures in the drawings are introduced.

DETAILED DESCRIPTION OF THE INVENTION

Figure 1:
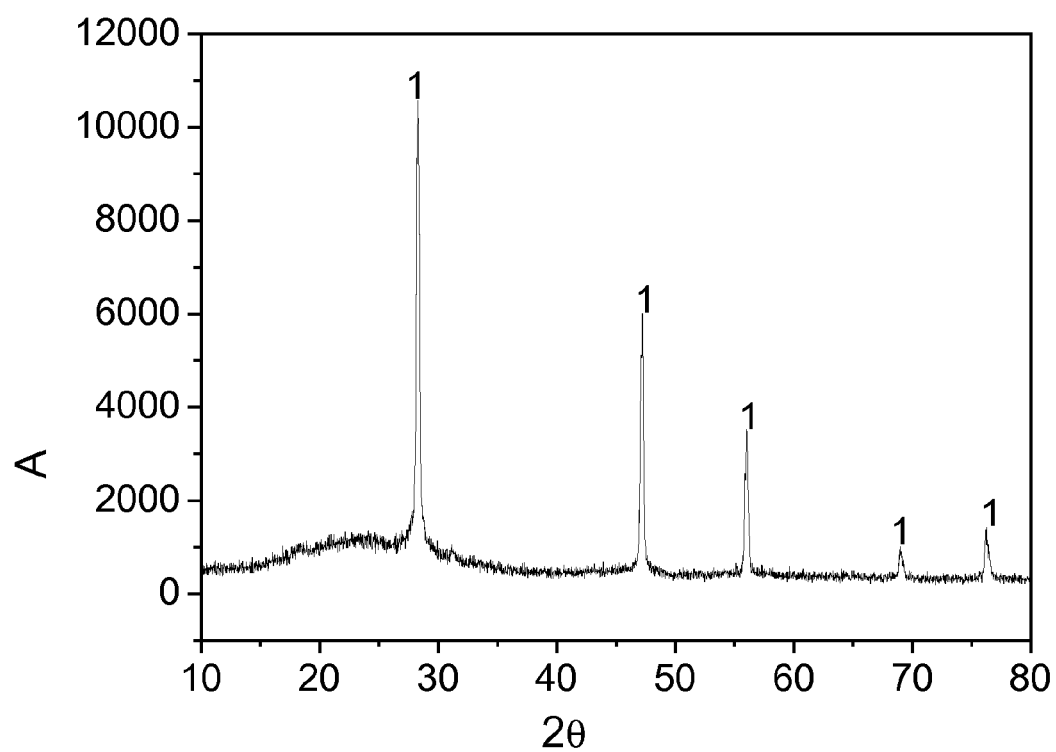
FIG. 1: XRD pattern [intensity vs. degree] of a Si—$SiO_x$/C material produced in accordance with Example 1 (all peaks are assignable to Si).

The invention provides an active material, preferably a negative active material, for a rechargeable lithium-ion battery, comprising metal (M) particles and a silicon oxide $SiO_x$ with $0<x<2$, wherein said $SiO_x$ is an intimate mixture of amorphous silicon (Si) and crystalline silicon dioxide ($SiO_2$).

In a first embodiment, the invention relates to an active material for a negative electrode of a lithium-ion rechargeable battery, containing metal-based particles and silicon oxide $SiO_x$ particles with $0<x<2$, wherein said $SiO_x$ is an intimate mixture of amorphous silicon (Si) and crystalline silicon dioxide ($SiO_2$). Preferably, said metal is Si, more preferably crystalline Si. For convenience, the collection of metal-based particles and silicon oxide $SiO_x$ particles is hereinafter referred to as "composite powder".

In a second preferred embodiment, the invention relates to an active material for a negative electrode of a lithium-ion rechargeable battery, containing metal-based particles at least partially covered by a layer comprising a silicon oxide $SiO_x$ with $0<x<2$, wherein said $SiO_x$ is an intimate mixture of amorphous silicon (Si) and crystalline silicon dioxide ($SiO_2$). Preferably, said metal is Si, more preferably crystalline Si. For convenience, the $SiO_x$-coated metal-based particles are hereinafter referred to as "composite particles".

The present inventors observed for the first time that it may be more beneficial for the LiB's performance to protect metal-based particles and in particular Si-based particles with a silicon oxide ($SiO_x$) layer containing crystalline $SiO_2$ than by using for protection $SiO_x$ layers containing amorphous $SiO_2$. Without being bound to any theory, the inventors related the obtained advantages to the benefits of $SiO_2$'s crystallinity on the various properties of the protective $SiO_x$ layer. Such benefits seem not present when using protective $SiO_x$ layers containing amorphous $SiO_2$ as developed by the above mentioned US 2012/0115033; US 2005/0233213 and US 2006/0068287.

Due to practical reasons, preferably the $SiO_x$ layer covering said metal-based particles, has a thickness of at least 1.0 nm, more preferably of at least 3.0 nm, most preferably of at least 5.0 nm. Preferably said thickness is at most 20 nm in order to optimize the $1^{st}$ irreversible capacity; more preferably at most 15 nm; most preferably at most 10 nm. Preferably said thickness is between 1 nm and 20 nm, more preferably between 3 nm and 15 nm, most preferably between 5 nm and 10 nm. Preferably, the $SiO_x$ layer comprises an intimate mixture of amorphous (Si) and crystalline silicon dioxide ($SiO_2$) such that $0.3 \leq x \leq 1.5$, more preferably $0.5 \leq x < 1.5$. Preferably, the $SiO_x$ layer covers at least 50% of the surface of the silicon-based (Si-based) particles, more preferably at least 70% of said surface, most preferably at least 90%.

Preferably, the composite particles used in accordance with the invention have a core-shell structure wherein the core of said particles contains the metal-based, more preferably the Si-based, particle and the shell of said structure contains the $SiO_x$ layer. Preferably, the shell completely surrounds the core of the particle.

Preferably the composite particles contained by the active material of the invention have an average diameter of at least 5 nm, more preferably at least 10 nm, most preferably at least 15 nm. Preferably the average diameter of said composite particles is at most 250 nm, more preferably of at most 175 nm, most preferably at most 100 nm. Preferably said average diameter is between 1 nm and 30 nm, more preferably of between 5 nm and 20 nm. For clarity, when calculating the average diameter of the composite particles, the thickness of the $SiO_x$ layer was taken into account.

Preferably, the composite particle are characterized by a ratio expressed as (the average diameter of the metal particles: the thickness of the $SiO_x$ layer) of at least 1:1; more preferably of at least 10:1; most preferably of at least 20:1. Said ratio is preferably at most 200:1; more preferably at most 150:1; most preferably at most 100:1.

For practical reasons, the composite particles preferably have a specific surface area (BET) of at least 0.1 $m^2/g$, more preferably at least 0.5 $m^2/g$. Preferably said particles have a BET of at most 40 $m^2/g$, more preferably of at most 30 $m^2/g$, most preferably at most 20 $m^2/g$. For clarity, the BET of said particles is defined for particles containing the $SiO_x$ layer.

In a third, more preferred embodiment, the invention relates to an active material for a negative electrode of a lithium-ion rechargeable battery, containing metal-based particles dispersed in a matrix comprising a silicon oxide $SiO_x$ with $0 < x < 2$, wherein said $SiO_x$ is an intimate mixture of amorphous silicon (Si) and crystalline silicon dioxide ($SiO_2$). Preferably, said metal is Si, more preferably crystalline Si. Preferably, the matrix consists of said $SiO_x$. Preferably, the $SiO_x$ contained by the matrix comprises an intimate mixture of (Si) and silicon dioxide ($SiO_2$) such that $0.3 \leq x \leq 1.5$, more preferably $0.3 \leq x < 1.0$. A matrix in accordance with the invention is understood as a material containing a plurality of metal based particles dispersed therein. For clarity, agglomerated composite particles, e.g. due to van der Waals and other electromagnetic forces acting between nearby particles to form agglomerates thereof, are not considered as a dispersion of metal particles in a $SiO_x$ matrix. For convenience, the $SiO_x$ matrix containing metal-based particles, is hereinafter referred to as composite matrix.

In a preferred embodiment, the active material containing the $SiO_x$ matrix with metal based particles dispersed thereof is itself particulated, i.e. the active material of the invention is in a powdery form containing particles comprising said matrix with said particles dispersed therein; the average diameter of said particles being at least 150 nm, more preferably at least 200 nm, most preferably at least 300 nm.

For all embodiments of the invention, preferably Si is chosen as the metal (M); in such case by Si-based particles is herein understood particles containing either/or (i) pure crystalline silicon; (ii) a homogeneous mixture of silicon- and metal-oxides, having the formula $SiO_x \cdot (M'_a O_b)_y$, with $0 < x < 1$ and $0 \leq y < 1$, wherein a and b are selected to provide electroneutrality, and wherein M' is either one or more of Ca, Mg, Li, Al, and Zr; (iii) an alloy of Si, preferably an alloy of formula Si—X, wherein X is either one or more metals of the group consisting of Sn, Ti, Fe, Ni, Cu, Co and Al; but also (iv) the silicon of any one of (i) to (iii) having an amorphous $SiO_z$ surface layer, with $0 < z < 2$, said surface layer preferably having an average thickness of between 0.5 nm and 10 nm.

The Si-based particles used in accordance with the invention preferably have an average diameter of at least 10 nm, more preferably at least 15 nm, most preferably at least 20 nm. Preferably the average diameter of said Si-based particles is at most 200 nm, more preferably of at most 150 nm, most preferably at most 100 nm.

Preferably, for any one of the embodiments of the present invention, the active material is characterized by a weight ratio (R) of between 10:1 and 1:1, more preferably between of 5:1 and 2:1, wherein R is calculated according to Formula 1:

$$R = W_{M\text{-based particle}} : W_{Mi\text{-based particle}} + W_{SiO_x} \quad \text{Formula 1}$$

wherein $W_{M\text{-based particle}}$ is the total weight of the metal-based particles contained by said material and $W_{SiO_x}$ is the total weight of the $SiO_x$ contained by said material. Preferably, said metal is Si, Fe, Sn or combinations thereof; most preferably said metal is Si.

The invention also relates to a compound containing the active material of the invention and further containing a lithium ion-conductive material. A range of materials have been found to be conductive to lithium, including oxides (e.g., copper oxide), polymers (e.g. sulfonated conductive polymer), polymeric carbons, amorphous and crystalline carbons, meso-phase carbon and combinations thereof. In one embodiment, the lithium ion-conductive material is a carbon-based (C-based) material. Suitable C-based materials include amorphous carbon; crystalline carbon, e.g. graphite, graphene; carbonizable precursor materials and combinations thereof. In case a carbonizable precursor material is used, the inventive composite can be further subjected to a heat treatment (e.g. firing) to convert the carbonizable material into an amorphous carbon, crystalline carbon or polymeric carbon depending on the nature of said carbonizable material and the firing conditions. A suitable example of a carbonizable material is pitch. In a further embodiment, the lithium ion-conductive material is a C-based material, said C-based material being a carbonaceous material, i.e. and amorphous and/or crystalline carbon material.

In a preferred embodiment of the inventive compound, the active material is in the form of the composite particles wherein said lithium ion-conductive material is preferably deposited on said composite particles forming a layer. Preferably, said layer of lithium ion-conductive material has a thickness of at least 10 nm, more preferably of at least 20 nm, most preferably of at least 30 nm. Preferably said thickness is at most 500 μm, more preferably at most 300 μm, most preferably at most 100 μm.

In a further preferred embodiment of the inventive compound, the active material is in the form of the composite particles wherein said compound contains a matrix containing said lithium ion-conductive material with said composite particles dispersed therein.

In yet a further preferred embodiment of the inventive compound, the active material is in the form of particles, said particles comprising the composite matrix, the lithium ion-conductive material forming a layer on said particles or being a matrix with said particles dispersed therein.

In a preferred embodiment, the invention relates to a powder containing particles comprising the inventive compound, hereinafter referred to as the "compound particles". Preferably, the compound particles have a BET lower than 25 m$^2$/g, preferably lower than 10 m$^2$/g and more preferably lower than 5 m$^2$/g.

For all of the embodiments related to the inventive compound, said lithium ion-conductive material is preferably a C-based material, the metal-based particles are Si-based particles, and said compound is preferably characterized by a ratio of the weight of the carbon versus the sum of the weights of Si-based particles and the SiO$_x$, expressed as (Si+SiO$_x$):C, of between 33:1 and 1:1, more preferably between 9:1 and 1.5:1.

In a particularly preferred embodiment, the present invention relates to a negative electrode powder for a lithium-ion rechargeable battery comprising one or more silicon based grains in a SiO$_x$/C matrix, with 0<x<2, wherein the SiO$_x$/C matrix comprises carbon and SiO$_x$, the SiO$_x$ being a nanometric mixture of crystalline SiO$_2$ and amorphous Si. This mixture is nanometric, and in some embodiments the individual particles of crystalline SiO$_2$ and amorphous Si have a size between 1 and 20 nm. In this powder, the reactive silicon grain surface is protected from the electrolyte by a stable matrix, to lower the expansion-contraction of the material, and to produce a low BET product including silicon sub-micron/nano grains. The silicon based grains may have an average grain size between 5 and 200 nm, and preferably between 50 and 150 nm. In one embodiment 0.3≤x≤1.5 and more preferably 0.5≤x<1.5. Preferably, the weight ratio of the Si based grains versus the sum of the grains and the SiO$_x$, expressed by Si+SiO$_x$:Si, is between 10:1 and 1:1, and more preferably between 5:1 and 2:1. Preferably the weight ratio of the carbon versus the sum of the Si grains and the SiO$_x$, expressed by (Si+SiO$_x$):C, is between 33:1 and 1:1, more preferably between 9:1 and 1.5:1. The powder of this particularly preferred embodiment may have a BET lower than 25 m$^2$/g, preferably lower than 10 m$^2$/g and more preferably lower than 5 m$^2$/g. Preferably, the SiO$_x$/C matrix comprising one or more silicon based grains, is composed of distinct parts having a core-dual shell morphology, the distinct parts comprising a core consisting of a Si based grain or an agglomerate of Si based grains, covered by a SiO$_x$ layer, the SiO$_x$ layer being composed of a nanometric mixture of crystalline SiO$_2$ and amorphous Si, and the SiO$_x$ layer being covered by a carbon layer. The silicon based grains may comprise either one of (i) pure crystalline silicon; (ii) silicon having a SiO$_x$ surface layer, with 0<x<2, the surface layer having an average thickness between 0.5 nm and 10 nm; (iii) a homogeneous mixture of silicon- and metal-oxides, having the formula SiO$_x$·(M$_a$O$_b$)$_y$, with 0<x<1 and 0≤y<1, wherein a and b are selected to provide electroneutrality, and wherein M is either one or more of Ca, Mg, Li, Al, and Zr; and (iv) an alloy Si—X, wherein X is either one or more metals of the group consisting of Sn, Ti, Fe, Ni, Cu, Co and Al.

The invention further provides a process for preparing the active material of the invention, comprising the steps of:
(a) providing a solution comprising an anti-agglomeration agent; a silicon comprising organic compound and a suitable solvent;
(b) heating up said solution to form a suspension of SiO$_2$ and Si in said suitable solvent;
(c) adding metal-based particles to said suspension; and
(d) firing said suspension to a temperature between 500 and 1300° C. in a non-oxidizing atmosphere.

By suitable solvent is herein understood a solvent facilitating a good mixing of said organic compound with said anti-agglomeration agent.

A further method that can be utilized to manufacture the SiO$_x$ used in the present invention is disclosed in European Application 12198559.2, incorporated herein in its entirety by reference.

In one embodiment, the inventive process comprises the steps of:
(a) providing an aqueous solution comprising an anti-agglomeration agent;
(b) dispersing a silicon comprising organic compound in the aqueous solution;
(c) hydrothermally treating the aqueous solution at a temperature between 90 and 180° C. for a period of 0.5 to 24 h, preferably between 110 and 140° C. for a period of 0.5 to 4 h, thereby forming a suspension of SiO$_2$ and Si in the aqueous solution;
(d) dispersing sub-micron sized metal-based, preferably silicon based, particles in the aqueous solution;
(e) evaporating the solution at a temperature below 100° C., thereby obtaining a slurry;
(f) subjecting the slurry to a coking process whereby a solid residue is formed;
(g) calcining the solid residue at a temperature between 500 and 1300° C., preferably between 600 and 1000° C., in a non-oxidizing atmosphere.

By hydrothermal treatment is herein understood a treatment at elevated temperatures and vapor pressures, i.e. aiming at reducing the evaporation of the water from the aqueous solution by increasing the pressure at which the thermal treatment of said solution takes place. Hydrothermal treatments are typically carried out in autoclaves.

In another embodiment, the inventive process comprises the steps of:
(a) providing a first aqueous solution comprising an anti-agglomeration agent;
(b) dissolving an organic carbon source in a second solution, said organic-carbon source being preferably water soluble and said second solution being preferably miscible with water;
(c) dispersing a silicon comprising organic compound in the first aqueous solution;
(d) hydrothermally treating the first aqueous solution at a temperature between 90 and 180° C. for a period of 0.5 to 24 h, preferably between 110 and 140° C. for a period of 0.5 to 4 h, thereby forming a suspension of $SiO_2$ and Si in the first aqueous solution;

(e) dispersing sub-micron sized metal-based, preferably silicon based, grains in the first aqueous solution;

(f) mixing the first aqueous solution and the second solution, thereby obtaining a third solution;

(g) evaporating the third solution at a temperature below the boiling point of the second solution, thereby obtaining a slurry;

(h) subjecting the slurry to a coking process whereby the organic carbon source is decomposed and a solid residue is formed;

(i) calcining the solid residue at a temperature between 500 and 1300° C., preferably between 600 and 1000° C., in a non-oxidizing atmosphere.

In this embodiment, the second solution may be a second aqueous solution, and the content of the organic carbon source in the second solution may be between 100 and 300 g/l.

The content of the anti-agglomeration agent in the (first) aqueous solution may be between 5 and 10 g/l.

In one embodiment, the quantities of the organic carbon source and the silicon comprising organic compound are provided so as to obtain a weight ratio of carbon versus the sum of the Si grains and the $SiO_x$, expressed by $(Si+SiO_x):C$, between 33:1 and 1:1, preferably between 9:1 and 1.5:1. In other words, the quantity of carbon is between 3 wt % and 50 wt % and preferably between 10 wt % and 40 wt %.

In some embodiments, the organic carbon source is sucrose and the coking process of the slurry is performed at a temperature between 150 and 350° C., preferably between 200 and 300° C. during 1 to 10 h. In other embodiments, the organic carbon source is epoxy resin and the coking process of the slurry is performed at a temperature between 250 and 450° C., preferably between 300 and 400° C. during 1 to 10 h.

In some embodiments, the anti-agglomeration agent is itself the source of carbon, i.e. it contains carbon. In other particular embodiments, the anti-agglomeration agent is either polyvinyl pyrrolidone or a vinyl pyrrolidone-vinyl ester copolymer.

In some embodiments, the silicon comprising organic compound is an alkyl ester of orthosilicic acid, preferably tetraethyl- or tetramethyl-orthosilicate.

In the process embodiments, the silicon based particles (or grains) may comprise either one of (i) pure crystalline silicon; (ii) a homogeneous mixture of silicon- and metal-oxides, having the formula $SiO_x.(M_aO_b)_y$, with $0<x<1$ and $0 \leq y<1$, wherein a and b are selected to provide electroneutrality, and wherein M is either one or more of Ca, Mg, Li, Al, and Zr; (iii) an alloy of Si, preferably an alloy of formula Si—X, wherein X is either one or more metals of the group consisting of Sn, Ti, Fe, Ni, Cu, Co and Al; but also (iv) the silicon of any one of (i) to (iii) having an amorphous $SiO_z$ surface layer, with $0<z<2$, said surface layer preferably having an average thickness of between 0.5 nm and 10 nm.

As mentioned in the discussion of the prior art, the $SiO_x$ powders were hitherto mainly prepared by simultaneously generating silicon and silicon oxide vapors, which method suffers from the high working temperature (more than 2000° C.) due to the low vapor pressure of silicon and silicon oxide and thereby high fabrication cost. The inventors made efforts to search for a simple and flexible method to produce Si—$SiO_x$/C negative electrode material for lithium ion batteries. In the text and Examples below "Si—$SiO_x$" stands for any composition with different weight fractions, expressed by for example Si-$2SiO_x$ or Si-$3SiO_x$. The inventors found that nano-sized silicon oxide ($SiO_x$) colloidal particles can for example be formed in a solution of a (alkoxy-) silane compound under hydrothermal condition. The temperature is low (it can be less than 150° C.) and the $SiO_x$ powders are formed from an aqueous solution, which is simple and environmentally friendly.

By adding pre-fabricated sub-micron metal-based, preferably silicon based, grains (or particles), preferably with a low oxygen (for example <5 wt %) content, in the process of the invention, the $SiO_x$/C material can be formed and/or applied as a matrix where one or more grains are dispersed as single particles or agglomerates thereof. The matrix may:

a) lower the surface area (BET) of the sub-micron sized grains, and b) provide a protective surface that undergoes a lower expansion than pure silicon and causes less decomposition of the electrolyte.

The carbon may be added to improve the conductivity or to modify the capacity of the active material. Also, the advantage of adding pre-fabricated sub-micron sized metal-based, preferably silicon based, most preferably crystalline silicon based, grains is that a first irreversible capacity may be obtained that is lower than the one of known materials, e.g. SiO materials. For example, the theoretical capacity of silicon is around 3600 mAh/g for $Li_{15}Si_4$ alloy, and the irreversible capacity is around 5 to 30% (depending on the oxygen content in the crystalline silicon and on the BET). The irreversible capacity of $SiO_x$ is however higher. By adjusting the Si to $SiO_x$/C ratio it is possible to monitor the first irreversible capacity. The higher the amount of crystalline Si, the lower the first irreversible capacity and, in parallel, the $SiO_x$/C material, e.g. when used as matrix, provides protection to the crystalline silicon for a better capacity retention. The $SiO_x$ material, e.g. when used as matrix, also decreases the expansion/contraction of the material by limiting the capacity. The x in $SiO_x$/C material may be lower than 1.5 to minimize the irreversible capacity due to the presence of $SiO_x$ and to increase the total capacity. In some embodiments x will even be chosen lower than 1. It was observed that when x is smaller than 0.3 the beneficial advantages of the $SiO_x$, e.g. when used as matrix, versus pure silicon may no longer be there, e.g. the expansion/contraction of the metal-based, e.g. silicon-based, particles may be increased, and the electrolyte decomposition may increase also. A lower limit of 0.5 is thus preferable for x.

As said before, $SiO_x$ and related materials may have a disadvantage when used for battery applications because their first irreversible capacity is relatively high. In an initial step during charging of a battery, electrons and lithium ions from the cathode are irreversibly consumed to form a $Li_2O/Li_4SiO_4$ matrix. To minimize the above effect and thus to reduce the irreversible capacity, various techniques were developed to reduce the $SiO_x$ surface available before the initial charging, e.g. milling with metallic Mg or Li. This adds a protective layer to prevent electrolyte decomposition and thus improves the coulombic efficiency (charge vs. discharge capacity) of the electrode and the capacity retention of the battery. Another approach to reduce the initial irreversible capacity is to decrease the value x in SiOx, i.e. to increase the Si content.

The thickness of the $SiO_x$/C layer can be controlled by adjusting the hydrothermal temperature and the concentration of the silicon comprising organic compound, hereinafter referred to as silane compound, in the solution versus the amount of core material, e.g. the sub-micron size metal (e.g. Si) powder. Coating the obtained Si—$SiO_x$ with carbon may be carried out via a sol-gel method or pyrolysis, milling or CVD route, which may enhance the lithium storage ability of the SiO$_x$ negative electrode material and improve the conductivity. The specific capacity of the M-SiO$_x$/C powder can be tailored by changing the carbon content in SiO$_x$/C composite powders and the ratio M to SiO$_x$/C or M+SiO$_x$/C. The specific capacity of the Si—SiO$_x$/C powder can be tailored likewise, by changing the carbon content in SiO$_x$/C composite powders and the ratio Si to SiO$_x$/C or Si+SiO$_x$/C.

Viewed from a third aspect, the invention can provide a use of the active material of the invention in a negative electrode consisting of 50 to 95 wt % of the active material, 2.5 to 25 wt % of a conductive agent and 5 to 25 wt % of a binder material. The negative electrode material comprising the above mentioned components may be used to construct a lithium ion battery having high capacity and improved cycle performance.

Hereinafter, the method of the invention will be more in detail described with the help of preferred embodiments, without being however limited thereto.

[1] In the method for producing Si—SiO$_x$/C of the present invention, silicon containing organics are used as starting material for producing nano-sized SiO$_x$ particles in hydrothermal conditions. Examples for such silicon containing organics include alkyl esters of orthosilicic acid, such as tetraethylorthosilicate (TEOS or tetraethoxysilane Si(OC$_2$H$_5$)$_4$), TMOS Si(OCH$_3$)$_4$) and among these, use of TEOS is preferable in view of the low toxicity and cost. The organics provide a source of carbon for producing the SiO$_x$/C compound.

[2] The TEOS is dispersed into water containing a certain amount of a known agglomeration inhibitor, preferably a carbon-containing compound, such as polyvinylpyrrolidone (PVP), to generate SiO$_x$ powders via a hydrothermal route. The content of TEOS in water may be in the range of 50-60 g/L of water, preferably 50-55 g/L. High contents of TEOS in water easily result in large particle size, while low contents of TEOS will cause small yields of SiO$_x$ powder after hydrothermal treatment. PVP is added in the range of 5-10 g/L of water, to help the dissolving of TEOS in water and to suppress the growth of agglomerates of SiO$_x$. Anti-agglomeration agents are known in the art, from e.g. U.S. Pat. No. 5,204,024, disclosing, besides PVP, vinyl pyrrolidone-vinyl ester copolymers. They can be represented as: polyvinyl pyrrolidone:

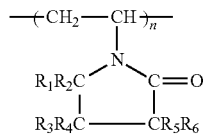

vinyl pyrrolidone-vinyl ester copolymer:

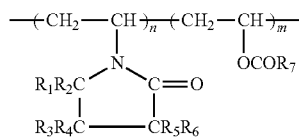

with, for both, n and m are integers of at least 1, and each of $R_1$ to $R_6$ is H or a $C_{1-4}$ alkyl group. $R_7$ is a $C_{1-2}$ alkyl group.

[3] The aqueous solution containing silicon source and PVP is transferred into an autoclave, which is put into an oven or muffle furnace for hydrothermal treatment (putting the aqueous solution at a high temperature under a high vapor pressure). The solution takes ½-¾ volume of the autoclave container, preferably ½-⅔. When the volume of the autoclave container is less than ½, the yield of the SiO$_x$ is lowered.

[4] The solution in the autoclave is hydrothermally treated at a temperature in the range of 100 to 180° C. for 0.5-10 h, and preferably 110-140° C. for 0.5-4 h, to thereby generate a SiO$_x$ suspension with x less than 2. The reaction is e.g. for TEOS: Si(OC$_2$H$_5$)$_4$+2 H$_2$O→SiO$_x$+4 C$_2$H$_5$OH. A small portion of Si is also generated, thereby creating the reaction product SiO$_x$ with x just below 2. Low hydrothermal temperature and short time easily result in SiO$_x$ particles with non-uniform size distribution. Excessively high temperature may cause large particle size, which may be unfavorable for the electrochemical properties of the Si—SiO$_x$/C composite. This variation of temperature influences the pressure inside the autoclave and this pressure can be approximated according to the basic knowledge of phase diagram. This means that if the temperature of autoclave is set, the pressure in the autoclave is determined.

[5] After cooling down to room temperature, the autoclave is opened and a pre-fabricated sub-micron silicon powder (for example made according to WO2012/000858, being a submicron sized Si based powder wherein the powder has a surface layer comprising SiO$_x$, with 0<x<2, the surface layer having an average thickness between 0.5 nm and 10 nm, and wherein the powder has a total oxygen content equal or less than 3% by-weight at room temperature) are dispersed into the hydrothermally treated SiO$_x$ suspension under strong stirring. The average particle size of sub-micron silicon is preferably between 5 and 200 nm, in some embodiments 20-200 nm, in other embodiments 50-150 nm. The amount of the sub-micron silicon is 10-50 wt % in the total amount of Si+SiO$_x$, preferably 20-30 wt %. A lower silicon content may cause (a) a higher first irreversible capacity because in the initial step electrons and lithium ions from the cathode are irreversible consumed to form the Li$_2$O/LiSiO$_4$ matrix; and (b) a low specific capacity. A silicon content higher than 50 wt % may result in rapid capacity fading upon charge/discharge cycling because the large volume expansion/contraction of the composite during the insertion/extraction of Li$^+$, which leads to a strong mechanical stress of the crystallites, and results in the loss of the electrical contact.

[6] In some embodiments, in order to increase and accurately control the carbon content, a carbon source is dissolved into a solution, which is then added into the mixed Si—SiO$_x$ suspension under strong stirring. The carbon source can be any known carbon source in the field of negative electrodes, for example a hydrocarbon compound, such as sugar, glucose, pitch and various resins. The solvent to dissolve the carbon source may be water, ethanol and methanol. The addition amount of the carbon source is equivalent to 3-50 wt % carbon in Si—SiO$_x$/C composite, preferably 10-40 wt %. A lower carbon content may cause poor electronic conduction and therefore affect the specific capacity of the invented Si—SiO$_x$/C active material, especially at high charge/discharge current density. A carbon content higher than 50 wt % may result in a lower specific capacity of the invented Si—SiO$_x$/C active material, due to the low specific capacity of the carbon component.

[7] The mixed solution containing sub-micron silicon, SiO$_x$ and, if present, a carbon source, is preferably heated under agitation or rotary condition with the aim of removing the solvent from the mixed solution. With respect to the heating process, vacuum environment and low temperature conditions are preferred. The heating temperature is preferably lower than the boiling point of solvent, for example for water as solvent lower than 100° C., and preferably 80-95° C. Higher heating temperature may lead to an inhomogeneous structure of Si—SiO$_x$/C material. The rotary and vacuum reflux condition are preferable, especially the rotary evaporator is recommended.

[8] The obtained viscous slurry is placed into a ceramic crucible and coked in an oven. The aim of coking is to remove the solvent completely and to decompose part of the organic carbon source and cause the product to solidify. The coking temperature depends strongly on the species of carbon present. As an example, when sucrose is used as carbon source, the coking temperature is in the range of 150-350° C., preferably 200-300° C. If the coking temperature is less than 150° C., the viscous slurry is difficult to be solidified. When the coking temperature is higher than 350° C., the slurry may severely decompose and lead to the product spurting out. When epoxy resin is used as carbon source, the coking temperature is in the range of 250-450° C., preferably 300-400° C. By the knowledge of the DSC (differential scanning calorimetry) pyrolysis curves of the organic carbon source and its behavior during pyrolysis the appropriate coking temperature can be selected.

[9] After coking treatment, the product may be grinded mechanically and then put into a ceramic crucible, followed by heating in a furnace under an inert or reducing atmosphere at a temperature of 400-1300° C., and preferably 600-1000° C., to produce Si—SiO$_x$/C material. When the calcination temperature is lower than 400° C., incomplete carbonization of the Si—SiO$_x$/C material might occur and hence some organic groups may remain. Heating to a temperature in excess of 1300° C. may result in the SiO$_x$ with higher crystallinity, which may lead to a poor electrochemical activity. During this process, carbon reacts with SiO$_2$ to form Si, and the carbon amount is selected to yield a final SiO$_x$ product with x<2. Without being bound to any theory, the inventors believe that this reaction is probably due to the particular surface state of SiO$_2$/Si particles after the hydrothermal treatment. A nano-effect may decrease the temperature of reduction of SiO$_2$ by the carbon.

[10] The value of x in the Si—SiO$_x$/C of the present invention is x<2, with preferred ranges mentioned above, and this value can be controlled by adjusting the composition of the surrounding atmosphere. The value of x in the Si—SiO$_x$/C materials prepared in inert atmosphere is higher than that prepared in a reducing atmosphere, such as H$_2$, CH$_4$ containing atmosphere. An oxygen-free atmosphere is beneficial for the preparation of Si—SiO$_x$/C with lower x value.

The invention will now be illustrated in the following examples and comparative experiments, without being however limited thereto. Table 1 below provides an overview of a half-cell charge/discharge test results.

Methods of Measurement

To measure the oxygen content of a sample, the specimen was ground to a granulometry of 0.25 mm, then sifted at 0.05 mm so as to retain only the 0.25-0.05 mm fraction. In fact, at the time of the preparation procedure, the fraction measuring less than 0.05 mm underwent additional oxidation, which could not be taken into consideration. A 250-mg test sample was collected from the 0.25-0.05 mm fraction, then packaged in a tin sheet in order to be placed in a graphite crucible of a LECO device at a temperature of 3,000° C. at which the sample was transformed into CO. The CO was subsequently oxidized so as to form CO$_2$, which was then analyzed. The final result was calculated based on the average obtained from five operations. To obtain the surface oxygen content, the same treatments were carried out on powders comprising a SiO$_x$ layer. Since the oxygen content within the mass of the product was virtually nil, the total concentration as measured corresponded to the surface content.

BET was determined in accordance with the theory developed by Brunauer, S., Emmett, P. H., and Teller, E., *J. Am. Chem. Soc.* 60: 309-319 (1938). was used.

The boiling point of a liquid phase is listed in the *Handbook of Chemistry and Physics*, ed. 2008-2009, at chapters 3, 4, 6, 12 and 15 (for detailed info the index at I-2, B can be used).

The specific density of the Si-based material contained by the Si-based particles was considered 2.3 g/m$^3$, regardless of its composition, i.e. whether the Si-based particles further contained dopants, oxides or alloyed materials.

Average diameter of particles was determined by SEM imagery by measuring the largest measurable distance between two points on the periphery of the particle, respectively. To obtain reliable data. SEM micrographs were taken with a 1000× magnification and at least 100 particles are measured on each SEM micrograph to determine objects having a diameter of at least 0.5 µm. The same procedure was repeated for the determination of objects having a diameter of below 0.5 µm; however the SEM micrographs were taken with a higher magnification (preferably above 50.000×). The sample may be prepared for SEM according to well known methodologies, e.g. by embedding it in resin followed by cutting and polishing to provide a smooth cross-section thereof. To aid in the counting and diameter measurement of a large number of particles, an image analysis software may be used, e.g. Image-Pro Plus from Media Cybernetics.

The average particle size for the input powders was determined on suspensions thereof by light-scattering method using commercially available equipment. The person skilled in the art will be familiar with this method, and in this context reference is also made to the disclosures given in JP 2002-151082 and WO 02/083555, which are hereby incorporated by reference. A Malvern 2000 equipment from Malvern Instruments GmbH, Herrenberg, Del., was used. The following measurement conditions were selected: compressed range; active beam length 2.4 mm; measurement range: 300 RF; 0.01 to 900 µm. The specimen preparation and measurement were carried out in accordance with the manufacturer's instructions.

The thickness of a layer, e.g. of SiO$_x$ or carbon, can be determined by High Resolution TEM (HR-TEM). Typical sample preparation included dispersing the sample in a suitable liquid followed by placing a suitable amount of the liquid dispersion on a standard TEM grid and allowing for the liquid to evaporate. In order to compensate for eventual thickness variations, the thickness of the layer was determined by averaging the results of a number of 10 random thickness measurements.

The surface coverage of the SiO$_x$ layer can be determined by HR-TEM.

The crystallinity or amorphicity of a sample can be determined by HR-TEM, electron diffraction (ED) and electron energy loss spectroscopy (EELS) mapping.

The HR-TEM was used to identify domains with different composition, EELS was used to identify which domains contain $SiO_2$ (the remaining domains being those containing Si) and ED was used to determine crystallinity.

The dimension of a Si (or $SiO_x$) domain as identified with the above mentioned HR-TEM/EELS/ED techniques can be determined from HR-TEM pictographs by measuring the largest distance between two points on the periphery of said domain.

Example 1: Si—$SiO_x$/C with Si:$SiO_x$ Ratio 1:1 in Weight and 20 wt % Carbon in Si—$SiO_x$/C Material

[1] Si-1$SiO_x$/C Powder Preparation:

At room temperature, 7.44 ml TEOS (tetraethylorthosilicate), used as Si source, is dissolved in 125 ml water, wherein 1 g polyvinylpyrrolidone (PVP) was added. The PVP plays two roles in the synthesis of nano-sized $SiO_x$. The first role is to help the dissolution of TEOS into water; this is because of the difficulty to directly dissolve TEOS in water and PVP is an amphipathic molecule with organic groups and inorganic group which can bring TEOS into water and promote the hydrolysis of TEOS into $Si(OH)_x$ particles. The second role of PVP is to prevent the agglomeration of nano-sized $SiO_x$ by hydrogen-bonding silanol groups (Si—OH), as illustrated by the following scheme:

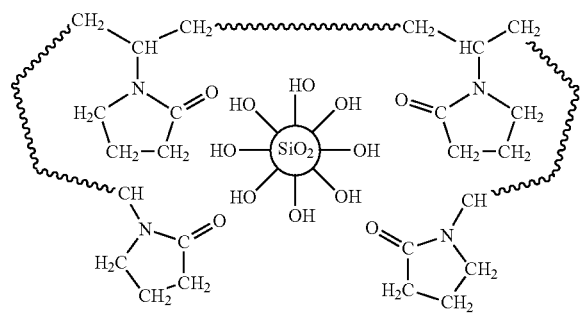

The solution is transferred to a 200 ml autoclave and hydrothermally treated at 130° C. for 1 h. After cooling down to room temperature, the solution inside the autoclave is transferred into a flask, and 2 g powder of sub-micron sized silicon grains (made according to Example 1 of WO2012/000858, thus being silicon having an amorphous $SiO_x$ surface layer, with 0<x<2, the surface layer having an average thickness between 0.5 nm and 10 nm, typically between 1 and 2 nm); are dispersed into hydrothermally treated $SiO_x$ suspension under strong stirring. The initial sub-micron sized powder of Si grains had a cubic crystalline phase and a specific surface area (BET) of 40±2 $m^2/g$, which corresponds to an average particle size of about 60 nm. Subsequently, a sucrose solution (2.375 g sucrose in 15 ml water) is introduced into it under strong stirring. The mixed solution is dried at 90° C. in a rotary evaporator under reflux condition. The obtained viscous slurry is coked at 250° C. for 5 h in an oven and then calcined at 800° C. for 1 h in 5% $H_2$/Ar atmosphere to produce a powder containing Si-1$SiO_x$/C composite particles.

Figure 2:
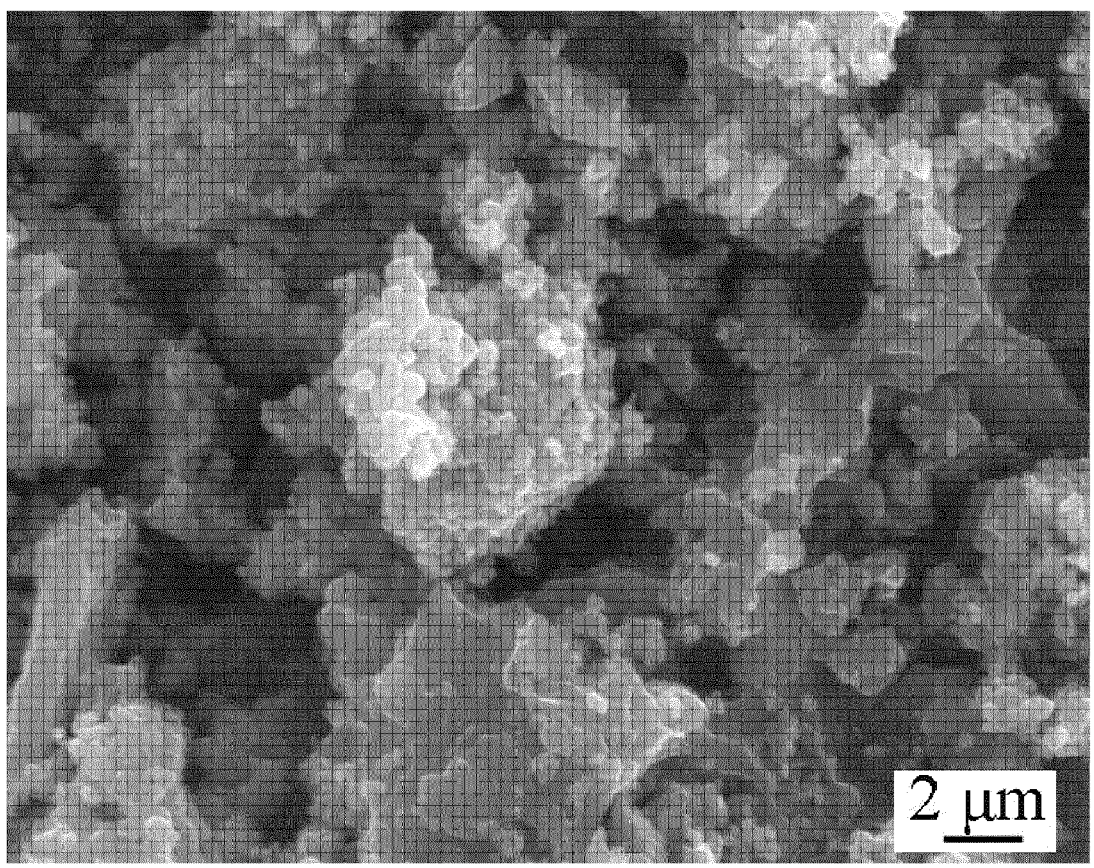
FIG. 2: SEM image of the Si—$SiO_x$/C material from Example 1.
Figure 3A:
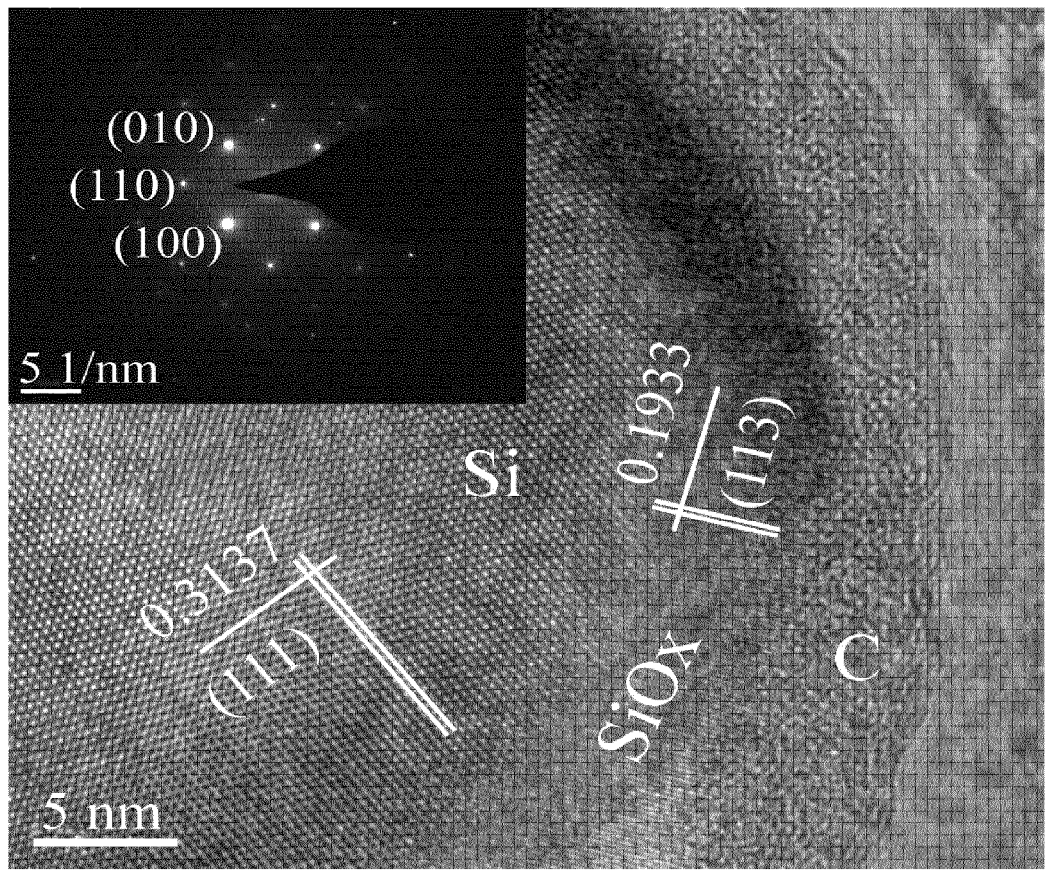
FIG. 3a: High Resolution-TEM images and electronic diffraction of the Si—$SiO_x$/C material from Example 1.

The silicon of the Si-1$SiO_x$/C powder exhibits a crystalline state and the Si in the SiO shows an amorphous state, as evidenced by XRD result (FIG. 1). The powder is composed of many aggregated large particles (2 to 15 μm), as depicted in FIG. 2. TEM/EELS/ED observation (FIG. 3a/3b) reveals that Si-1$SiO_x$/C particles are actually composed of distinct parts with core-dual shell structure, where a well-ordered Si core is coated by $SiO_x$ layer which is composed of crystalline $SiO_2$ and amorphous silicon, coated itself by carbon. The FIG. 3a indicates the lattice fringe of crystals which are in agreement with Si (111) plane spacing and with $SiO_2$ (113) space spacing.

[2] Cell Preparation:

The prepared Si-1$SiO_x$/C powder is evaluated as negative electrode material in the following cell test. Electrodes containing 70 wt % Si-1$SiO_x$/C powder (active material), 15 wt % acetylene black (conductive carbon), and 15 wt % sodium carboxymethyl cellulose (CMC, binder) were made by coating the slurry of the electrode ingredients in deionized water onto copper foil, which is dried at 120° C. in a vacuum oven for 6 h. The copper foil with electrode materials are then punched into circular discs with a diameter of 8 mm and vacuum dried overnight. The working electrodes are assembled in Swagelok cells using Celgard 2400 as the separator and lithium foil as counter electrode. The electrolyte consists of 1 M $LiPF_6$ in a non-aqueous solution of ethylene carbonate (EC), ethyl methyl carbonate (EMC) and dimethyl carbonate (DMC) (1:1:1 by volume). The cell is assembled in an Ar-filled glove box with oxygen and water contents less than 1 ppm. Galvanostatic cycling test are conducted on a battery test system in a voltage range of 0.01-2.5 V vs. Li/$Li^+$ at a current density of 100 $mAg^{-1}$.

Figure 4:
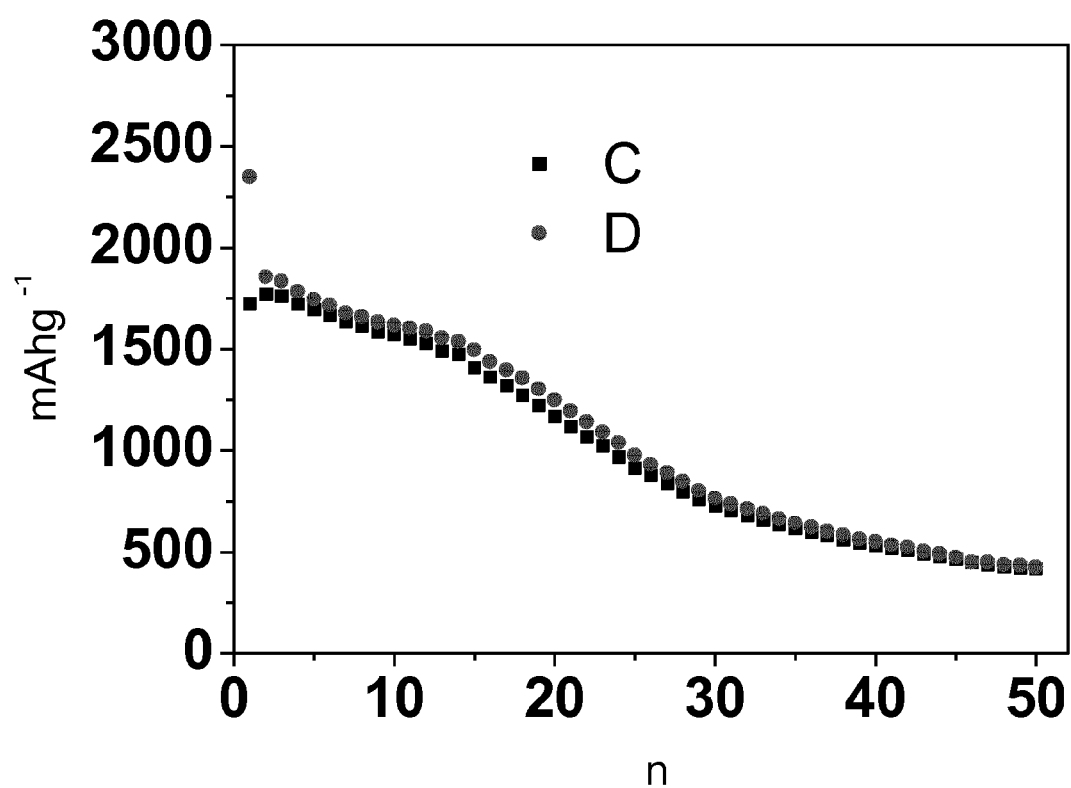
FIG. 4: Lithiation (D)—delithiation (C) capacity (in mAh/g of active material) of a battery using powder from the material of Example 1 at a current of 100 $mAg^{-1}$.

The charge/discharge test is carried out 50 cycles on the half-cell (see FIG. 4). The cell marks an initial ($1^{st}$ cycle) charge capacity (delithiation) of 1724.5 $mAhg^{-1}$, and the $15^{th}$ and $50^{th}$ cycle charge capacity of 1474 and 417.4 $mAhg^{-1}$, respectively.

Example 1a

In an alternative to Example 1, no sucrose solution is added to the hydrothermally treated $SiO_x$ suspension. The organic anti-agglomeration agent contains carbon, because PVP is added into the water during the hydrothermal process and the decomposition of TEOS produces molecules containing carbon which are not eliminated, so the obtained $SiO_x$ from the hydrothermal route is $SiO_x$ with some carbon compounds attached on the particle surface. After heat treatment, these compounds will decompose to carbon. The resulting product will have a lower carbon content than Example 1, but will still produce the effects of the invention.

Figure 3B:
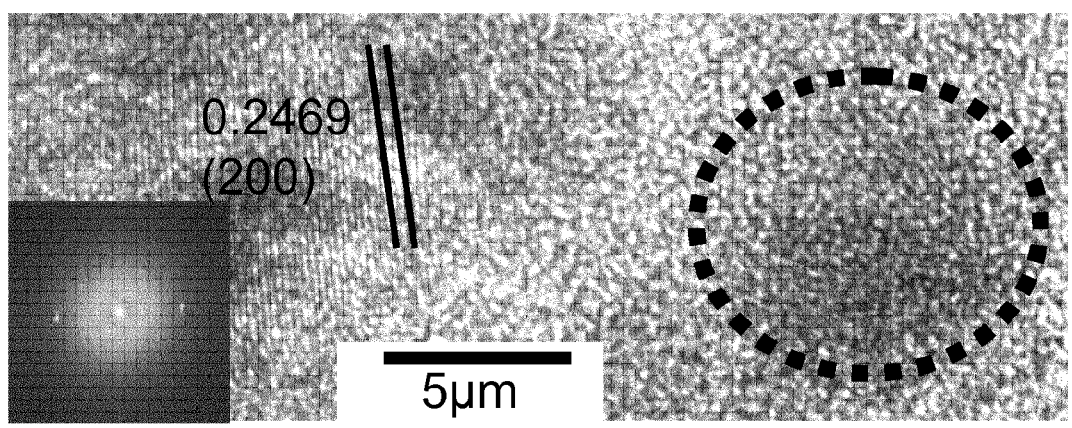
FIG. 3b shows a High Resolution-TEM image of the $SiO_x$ material utilized in accordance with the invention.

Instead of using a $SiO_x$ layer as in the above Examples 1 and 1a, particles of $SiO_x$ can be used. Such particles can be produced in accordance with EP Application 12198559.2, incorporated herein by reference. FIG. 3b taken on $SiO_x$ particles, reveals that the $SiO_x$ particles are actually composed of two distinct parts, well-ordered parts and disordered parts. In the ordered part, lattice fringes can be observed, and the lattice spacing agrees with $SiO_2$ (200) plane spacing. The amorphous part (indicated in the picture with dot line) is amorphous silicon. The intimate mixture of crystallized part and amorphous part can be also visualized with the electron diffraction (ED) which shows a none defined signal with some dots which can be indexed and are in correlation with $SiO_2$ crystal. To differentiate the amorphous carbon from the amorphous silicon, ED was used.

Example 2: Si—$SiO_x$/C with Si:SiOx Ratio 2:1 in Weight and 20 wt % Carbon in Si—$SiO_x$/C Composite At room temperature, 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. After cooing down to room temperature, the solution inside the autoclave is transferred into a flask, and 1 g sub-micron sized silicon grains (the same material as in Example 1) are dispersed into hydrothermally treated $SiO_x$ suspension under strong stirring, then a sucrose solution (1.781 g sucrose in 15 ml water) is introduced into it under strong stirring. The mixed solution is dried at 90° C. in a rotary evaporator under reflux condition. The obtained viscous slurry is coked at 250° C. for 5 h in an oven and then calcined at 800° C. for 1 h in 5% $H_2$/Ar atmosphere to produce a powder containing Si-$2SiO_x$/C composite particles.

Figure 5:
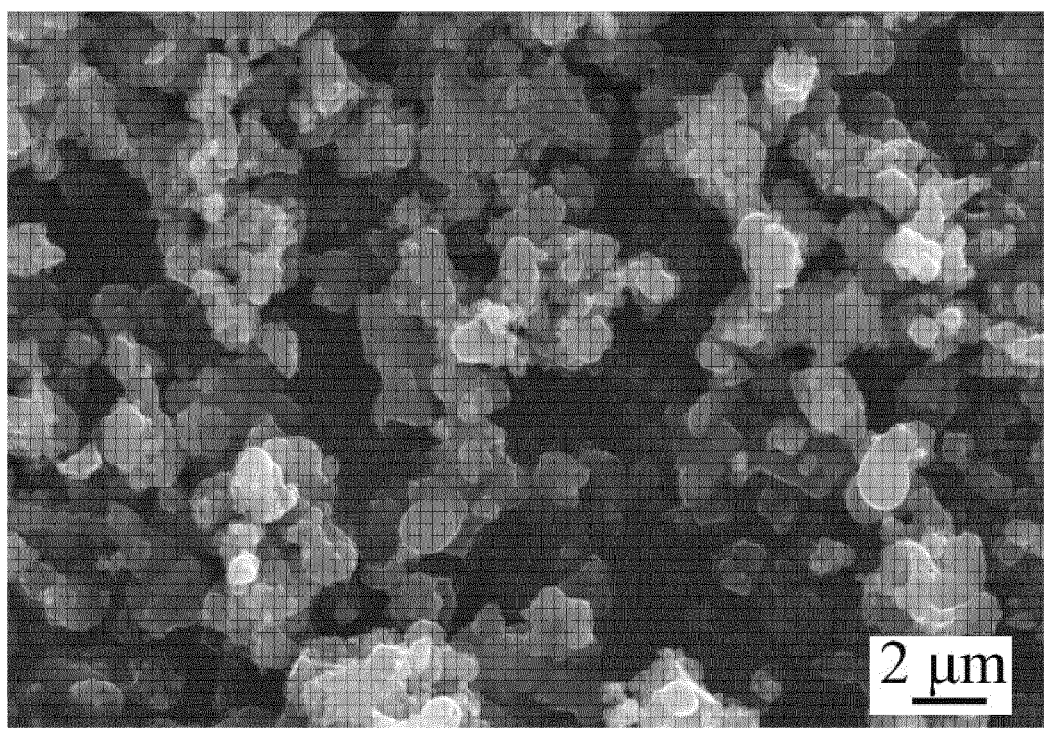
FIG. 5: SEM image of a Si-$2SiO_x$/C material produced in accordance with Example 2.
Figure 6:
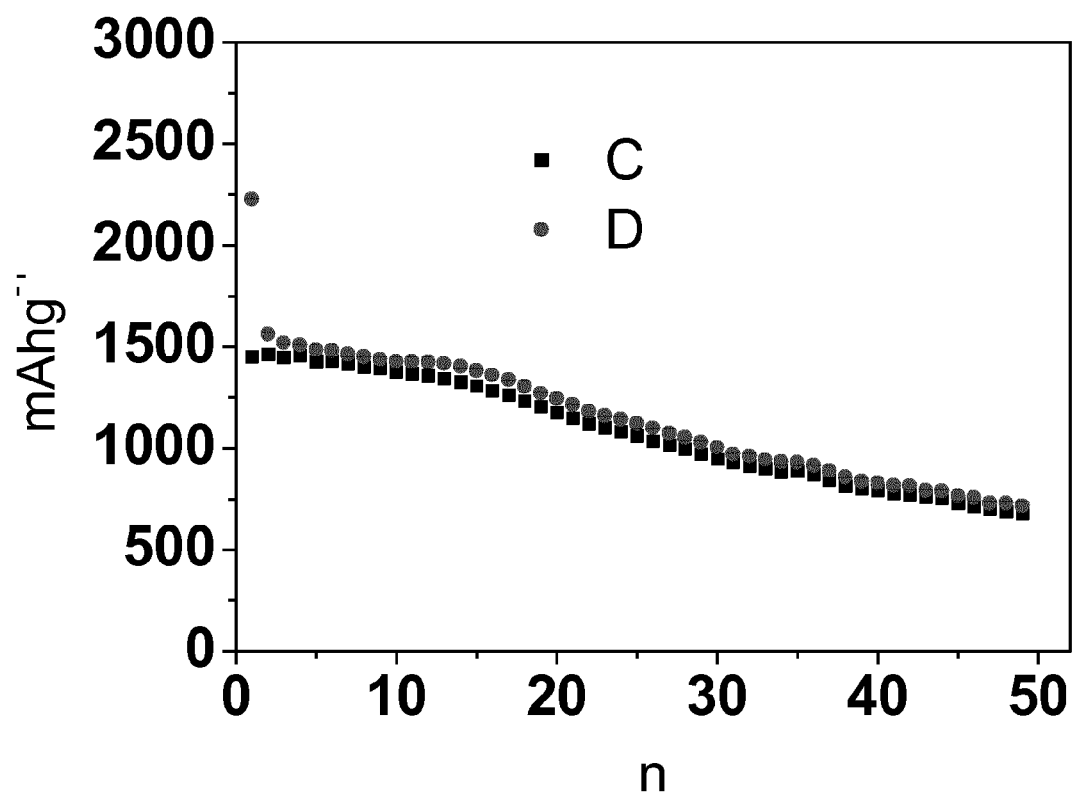
FIG. 6: Lithiation (D)—delithiation (C) capacity (in mAh/g of active material vs. cycle number) of a battery using powder from Example 2 at a current of 100 $mAg^{-1}$.

The obtained powder presents a similar XRD profile as Example 1. The powder is composed of smaller aggregates than in Example 1, with an average particle size of 1 μm, as depicted in FIG. 5. As in Example 1, the prepared Si-$2SiO_x$/C composite powder is used as active material for a negative electrode in a lithium ion half-cell (FIG. 6). The cell exhibits an initial charge capacity of 1451 mAh/g, and the $15^{th}$ and $50^{th}$ cycle charge capacity of 1306 mAh/g and 678 mAh/g respectively, indicating a low specific capacity but an improved cycling stability in comparison to Example 1.

Example 3: Si—SiOx/C with Si:SiOx Ratio 3:1 in Weight and 20 wt % Carbon in Si—SiOx/C Composite At room temperature, 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. After cooling down to room temperature, the solution inside the autoclave is transferred into a flask, and 0.667 g sub-micron sized silicon grains (the same material as in Example 1) are dispersed into the hydrothermally treated $SiO_x$ suspension under strong stirring, then a sucrose solution (1.583 g sucrose in 15 ml water) is introduced into it under strong stirring. The mixed solution is dried at 90° C. in a rotary evaporator under reflux condition. The obtained viscous slurry is coked at 250° C. for 5 h in an oven and then calcined at 800° C. for 1 h in 5% $H_2$/Ar atmosphere to produce a powder containing Si-$3SiO_x$/C composite particles.

Figure 7:
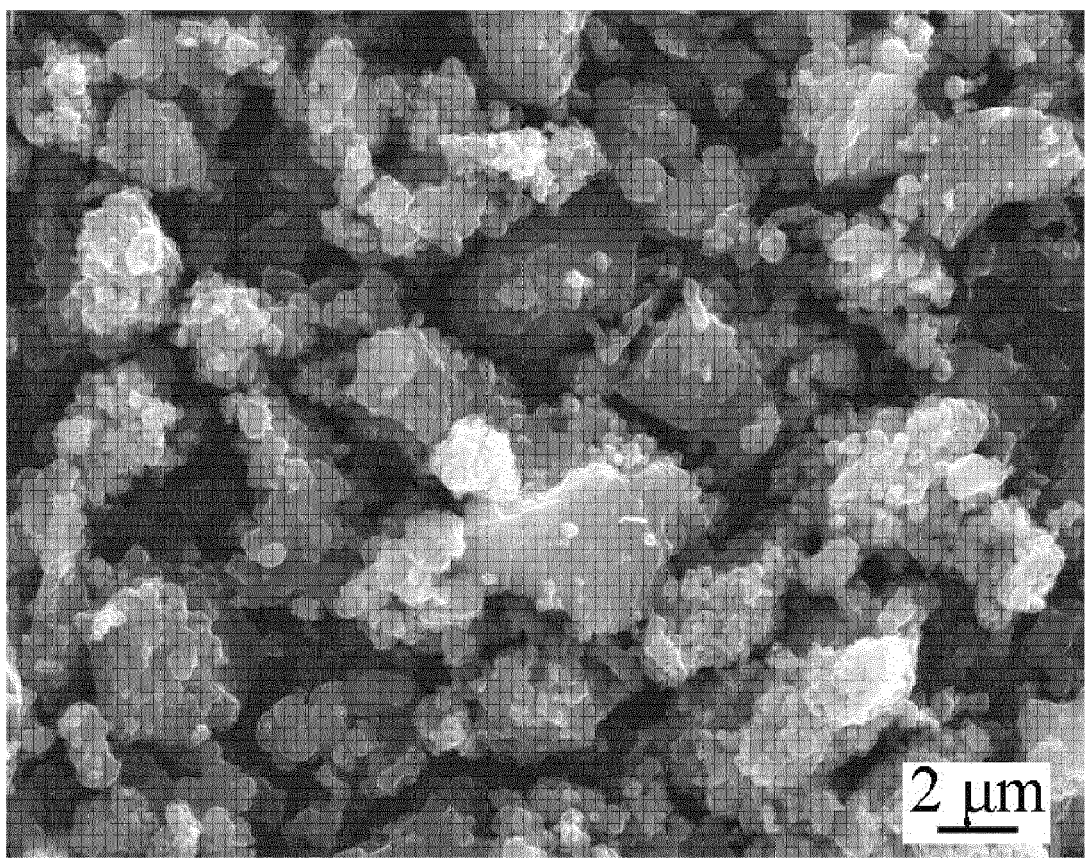
FIG. 7: SEM image of a Si-$3SiO_x$/C material produced in accordance with Example 3.
Figure 8:
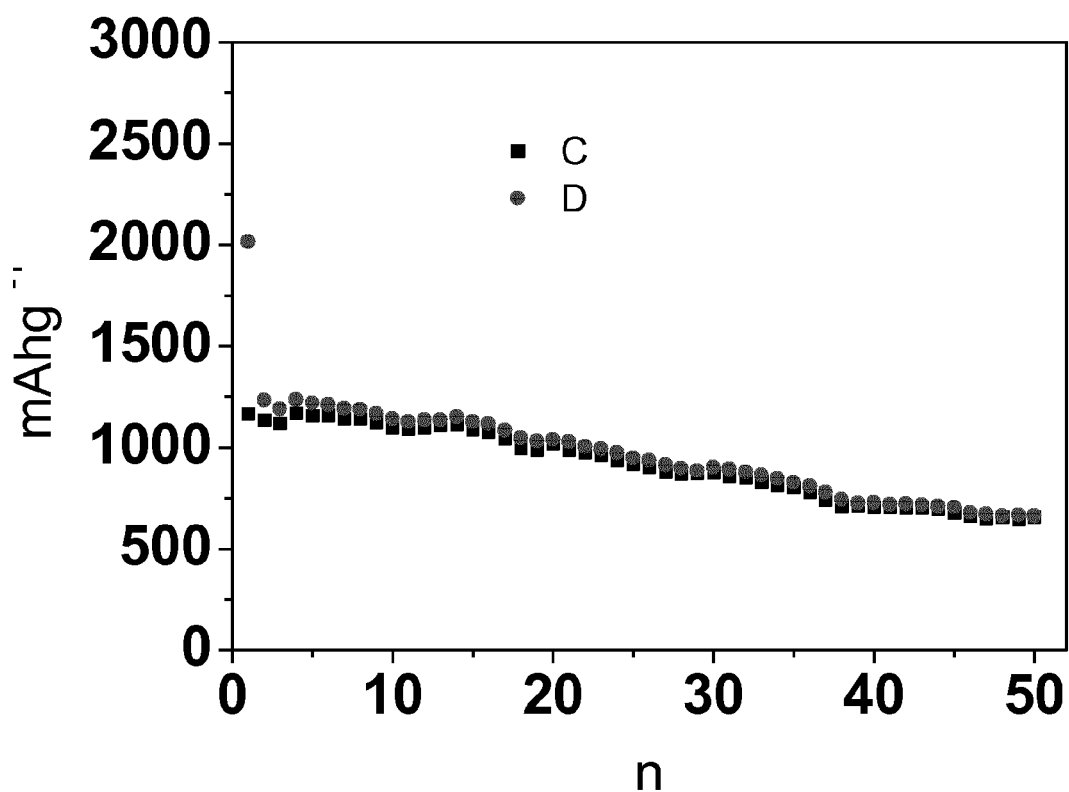
FIG. 8: Lithiation (D)—delithiation (C) capacity (in mAh/g of active material vs. cycle number) of a battery using powder from Example 3 at a current of 100 $mAg^{-1}$.

The obtained powder presents a similar XRD profile as the previous Examples. The powder is composed of many aggregated large particles (1 to 15 μm), as depicted in FIG. 7. As in Example 1, the prepared Si-$3SiO_x$/C composite powder is used as active material in a negative electrode in a lithium ion half-cell (FIG. 8). The cell marks an initial charge capacity of 1165 mAh/g, and the $15^{th}$ and $50^{th}$ cycle charge capacity of 1088 mAh/g and 650 mAh/g, respectively, indicating a lower specific capacity than but a better cycling stability.

Example 4: Si—SiOx/C—Mg

The pristine Si-$1SiO_x$ powder obtained in Example 1 is used as precursor to produce Si-$1SiO_x$/C—Mg. This metal oxide mixture is prepared by mixing 80 wt % of the Si-$1SiO_x$/C with 20 wt % of metallic Mg (commercial product from Aldrich) in a planetary mixer during 1 h (with 650 rotation per minutes, weight ratio ball/powder: 20/1). The particles remain micrometric (between 1 and 15 μm). The oxygen proportion seems to indicate that the oxygen content remains stable during this process.

A slurry is prepared using 50 wt % of this powder, 25 wt % of a Na-CMC binder (Molecular weight<200 000) and 25 wt % of a conductive additive (Super C65, commercial product from Timcal). In a first step, a 2.4% Na-CMC solution is prepared and dissolved overnight. Then, the conductive carbon is added to this solution and stirred for 20 minutes using a high-shear mixer. Once a good dispersion of the conductive carbon is obtained, the active material is added and the slurry is stirred again using a high-shear mixer during 30 minutes.

The electrodes are prepared by coating the resulting slurry on a copper foil (thickness: 17 μm) with a slurry layer thickness of 125 μm and then drying at 70° C. for 2 hours. Round electrodes are punched and dried at 150° C. during 3 hours in a small vacuum oven. The electrodes are electrochemically tested versus metallic lithium in coin cells prepared in a glove-box under dry argon atmosphere. The electrolyte used is 1M $LiPF_6$ in a mix of ethylene carbon (EC)/diethylcarbonate (DEC) (50/50 wt %)+10% fluoroethylcarbonate (FEC)+2% vinylene carbonate (VC) (commercial product of Semichem). The coin cells are tested in a continuous current (CC) mode between 10 mV and 1.5 V at a rate of C/5 (meaning a full charge or discharge of 500 mAh/g of active material in 5 hours). The batteries show a similar performance as the Example 1, with an improvement of the capacity retention (65% after 50 cycles versus 24% in the example 1).

Counter Example 1: Si/C

At room temperature, 2 g of sub-micron silicon powder (the same material as in Example 1) is dispersed in 125 ml water under strong stirring, then a sucrose solution (1.188 g sucrose in 15 ml water) is introduced into it under strong stirring. The mixed solution is dried at 90° C. in a rotary evaporator under reflux condition. The obtained viscous slurry is coked at 250° C. for 5 h in an oven and then calcined at 800° C. for 1 h in 5% $H_2$/Ar atmosphere to produce Si/C composite powders.

Figure 9:
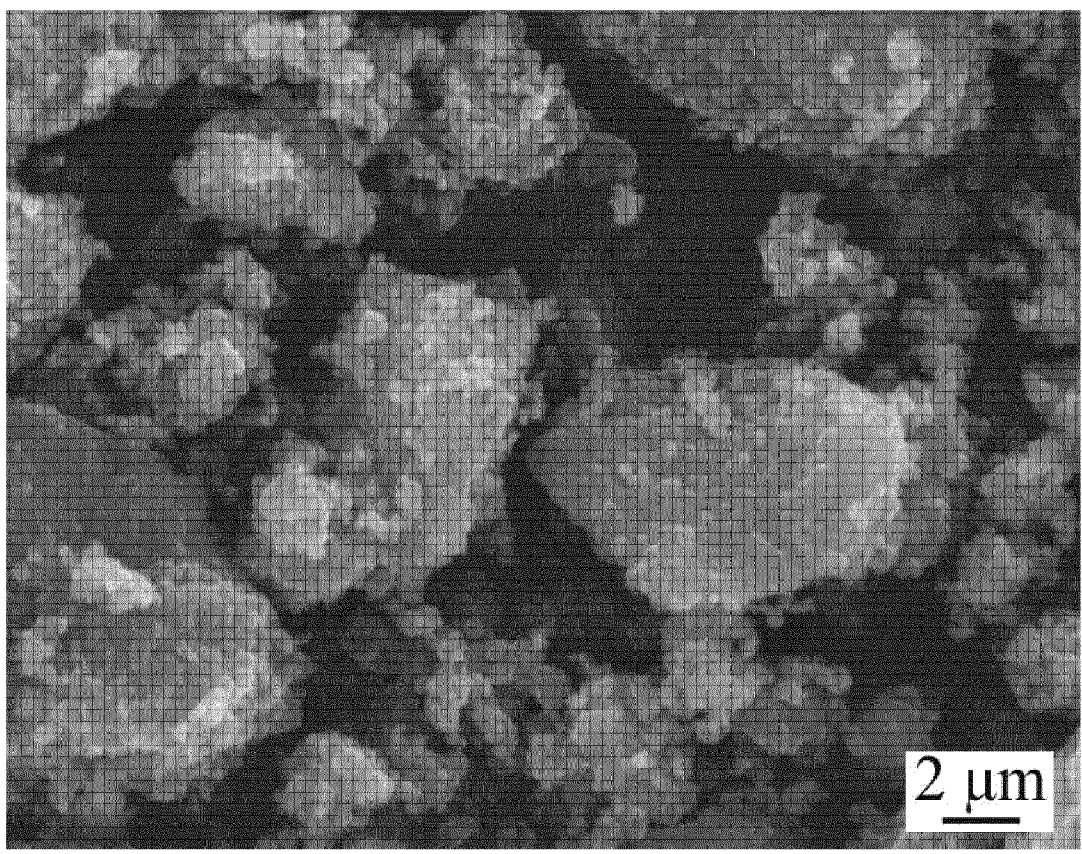
FIG. 9: SEM image of a Si/C material produced in accordance with Counter Example 1.

The obtained powder presents a similar XRD profile as in Example 1. The powder is composed of many aggregated large particles (1 to 15 μm), as depicted in FIG. 9.

Figure 10:
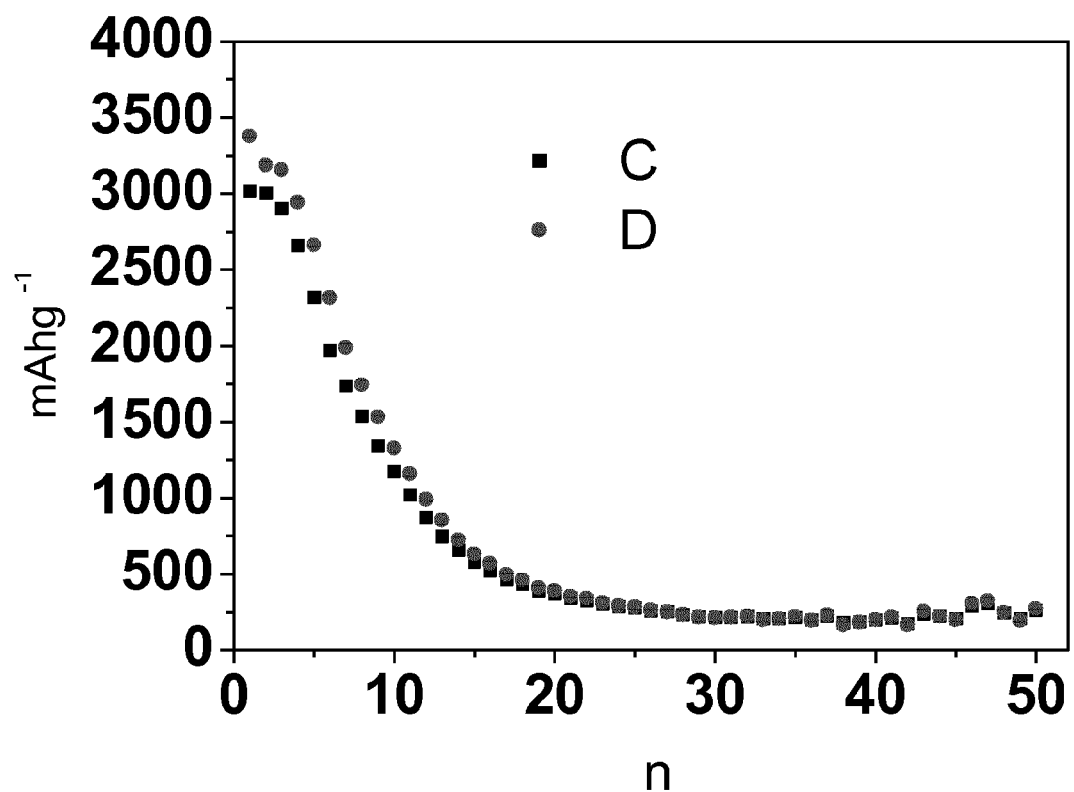
FIG. 10: Lithiation (D)—delithiation (C) capacity (in mAh/g of active material vs. cycle number) of a battery using powder from Counter Example 1 at a current of 100 $mAg^{-1}$.

As in Example 1, the prepared Si/C composite powder is tested as active material for a negative electrode in a lithium ion half-cell (see FIG. 10). The cell marks an initial charge capacity of 3018 mAh/g, an initial discharge capacity of 3377 mAh/g, the $15^{th}$ and $50^{th}$ cycle discharge capacity of 659 and 272 mAh/g, respectively, and a cycle retention of 9% after 50 cycles, indicating a high first reversible capacity but poor electrochemical cyclability. This Example proves the interest of the Si—$SiO_x$ structure to maintain the capacity retention. Table 1 shows a comparison of the capacity retention and clearly indicates that the presence of $SiO_x$ increases the capacity retention of the powder.

Counter Example 2: $SiO_x$/C

At room temperature, an amount of 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. After cooling down to room temperature, the solution inside the autoclave is transferred into a flask, and then a sucrose solution (1.188 g sucrose in 15 ml water) is introduced into it under stirring. The mixed solution is dried at 90° C. in a rotary evaporator under reflux condition. The obtained viscous slurry is coked at 250° C. for 5 h in an oven and then calcined at 800° C. for 1 h in 5% $H_2$/Ar atmosphere to produce $SiO_x$/C composite powders.

Figure 11:
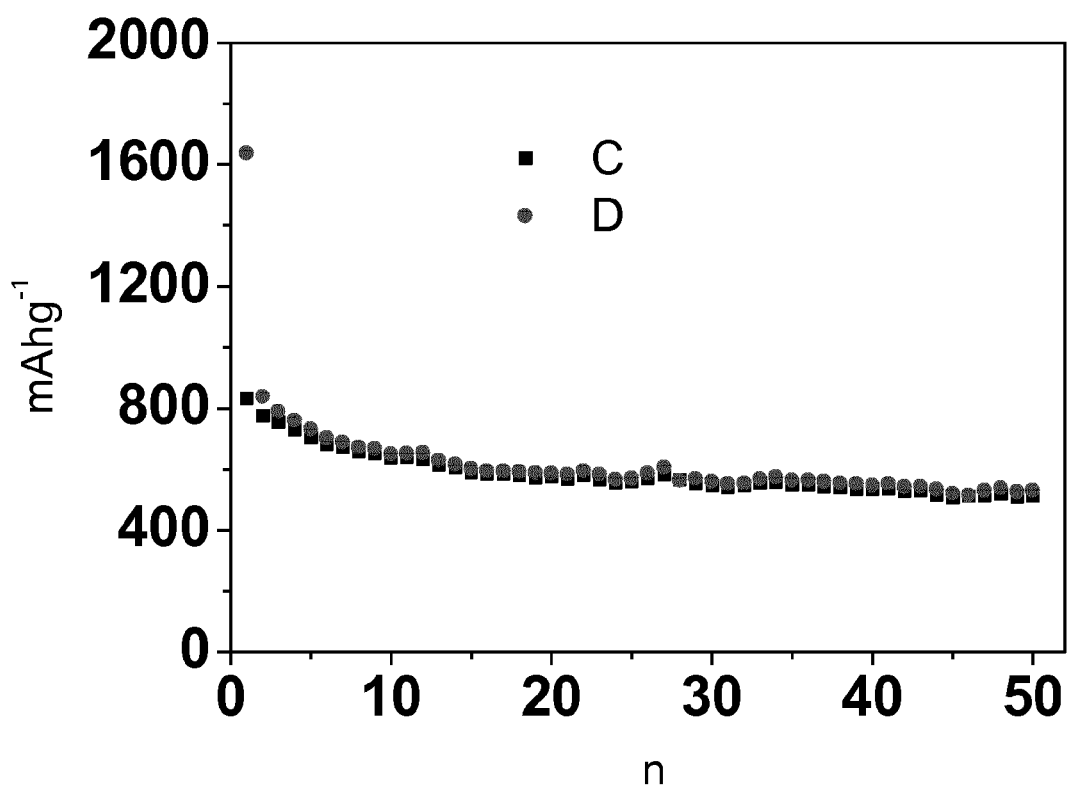
FIG. 11: Lithiation (D)—delithiation (C) capacity (in mAh/g of active material vs. cycle number) of a battery using powder from Counter Example 2 at a current of 100 $mAg^{-1}$.

As in Example 1, the prepared $SiO_x$/C composite powder is used as active material for a negative electrode in a lithium ion half-cell (see FIG. 11). The negative electrode is prepared and evaluated by a cell test. The cell marks an initial charge capacity of 833 mAh/g, an initial discharge capacity of 1637 mAh/g, a $50^{th}$ cycle discharge capacity of 529 mAh/g, and a cycle retention of 64% after 50 cycles, indicating a low first reversible capacity but good electrochemical cycleability.

Examples 1-4 show the interest of the Si—$SiO_x$/C structure to decrease the first irreversibility and to increase the capacity. Table 1 clearly indicates the relation between the quantity of $SiO_x$ and the first irreversibility of the product.

TABLE 1

Comparison of electrochemical performance of the different examples.

| SiO$_x$:Si ratio | Carbon content | | 1st cycle | | Delithiation capacity | | % of first irreversible capacity | Capacity retention at cycle 50 |
|---|---|---|---|---|---|---|---|---|
| | (Si + SiOx):C | wt % | Lithiation mAh/g | Delithiation mAh/g | Cycle 15 mAh/g | Cycle 50 mAh/g | % | % |
| 1:1 | 8:1 | 20% | 2350 | 1724 | 1474 | 417 | 27 | 24 |
| 2:1 | 8:1 | 20% | 2240 | 1451 | 306 | 678 | 35 | 47 |
| 3:1 | 8:1 | 20% | 2050 | 1165 | 1088 | 650 | 43 | 56 |
| No SiOx | 9:1 | 10% | 3377 | 3018 | 659 | 272 | 11 | 9 |
| No Si | — | 8-15% | 1637 | 833 | 630 | 529 | 49 | 64 |

The invention claimed is:

1. A compound comprising an active material for a rechargeable lithium-ion battery and a lithium ion-conductive carbon-based material, whereby the active material comprises Si-based particles and a silicon oxide SiO$_x$ with 0<x<2, wherein said SiO$_x$ is an intimate mixture of amorphous silicon (Si) and crystalline silicon dioxide (SiO$_2$), whereby said compound is characterized by a ratio of the weight of the carbon versus the sum of the weights of Si-based particles and the SiO$_x$, expressed as (Si+SiO$_x$):C, of between 33:1 and 1:1.

2. The compound according to claim 1, whereby the ratio of the weight of the carbon versus the sum of the weights of Si-based particles and the SiO$_x$, expressed as (Si+SiO$_x$):C, is between 9:1 and 1.5:1.

3. The compound according to claim 1, wherein the Si-based particles have an average diameter of at least 10 nm and of at most 200 nm.

4. The compound according to claim 1, wherein the SiO$_x$ contains domains comprising metallic Si, said domains having a dimension of between 1 nm and 5 nm.

5. The compound according to claim 1, wherein said SiO$_x$ is in the form of SiO$_x$ particles.

6. The compound according to claim 1, wherein said SiO$_x$ is in the form of a layer at least partially covering said Si-based particles.

7. The compound according to claim 6, wherein the SiO$_x$ layer has a thickness of at least 1.0 nm and at most 20 nm.

8. The compound according to claim 6, characterized by a ratio expressed as the average diameter of the metal particles: the thickness of the SiO$_x$ layer of at least 1:1 and at most 200:1.

9. The compound according to claim 1, wherein said SiO$_x$ is in the form of a matrix.

10. The compound according to claim 1, wherein the Si is chosen from the group consisting of (i) pure crystalline silicon; (ii) a homogeneous mixture of silicon- and metal-oxides, having the formula SiO$_x$ (M'$_a$O$_b$)$_y$, with 0<x<1 and 0≤y<1, wherein a and b are selected to provide electroneutrality, and wherein M' is one or more of Ca, Mg, Li, Al, and Zr; (iii) an alloy of Si; and (iv) the silicon of any one of (i) to (iii) having an amorphous SiO$_z$ surface layer, with 0<z<2, said surface layer having an average thickness of between 0.5 nm and 10 nm.

11. The compound according to claim 1, wherein 0.3≤x≤1.5.

12. A process for preparing the active material of the compound of claim 1, comprising:
 a. providing a solution comprising an anti-agglomeration agent; a silicon comprising organic compound and a suitable solvent;
 b. heating up said solution to form a suspension of SiO$_2$ and Si in said suitable solvent;
 c. adding Si-based particles to said suspension; and
 d. firing said suspension to a temperature between 500 and 1300° C. in a non-oxidizing atmosphere.

13. The process of claim 12, wherein the silicon containing organic compound is an alkyl ester of orthosilicic acid.

* * * * *